Patented May 8, 1928.

1,669,069

UNITED STATES PATENT OFFICE.

FRITZ STRAUB, OF BASEL, AND HERMANN SCHNEIDER, OF RIEHEN, NEAR BASEL, SWITZERLAND, ASSIGNORS TO THE FIRM SOCIETY OF CHEMICAL INDUSTRY IN BASLE, OF BASEL, SWITZERLAND.

PRODUCTION OF AZO-DYESTUFFS CONTAINING TWO HYDROXYNAPHTHALENE NUCLEI.

No Drawing. Application filed April 7, 1926, Serial No. 100,440, and in Switzerland April 25, 1925.

The present invention deals with an improvement in the production of the dyestuffs disclosed in the United States Patent No. 1,521,206 which have presumably the general formula:

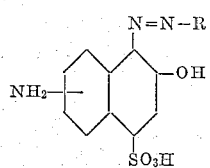

wherein R indicates a hydroxynaphthalene nucleus to which the azo-bridge is attached in ortho-position to the hydroxyl-group. These dyestuffs are obtained by treatment with reducing agents of the dyestuffs produced by coupling the nitrated diazo-compound of 1-amino-2-hydroxynaphthalene-4-sulfonic acid with a naphthol.

It has been found that the dyestuffs named above may be obtained with much better yields by conducting the reduction in presence of a water-soluble organic compound having hydroxyl-groups, for example a carbohydrate, such as glucose or cane sugar, an alcohol, such as glycerine or glycol, or a more complex compound, such as tannin, gallic acid or sulfite cellulose waste liquor. As reducing agents themselves there are particularly suitable alkali sulfides, such as sodium sulfide, sodium sulfhydrate or sodium polysulfide, as has already been disclosed in U. S. patent specification 1,521,206.

Example 1.

A suspension, as concentrated as possible, of the dyestuff made by coupling 150 parts of α-naphthol with 295 parts of nitrated diazotized 1-amino-2-hydroxynaphthalene-4-sulfonic acid is mixed, while stirring, with 25 parts of glycerine or glucose, 145 parts of caustic soda solution of 30 per cent strength and 360 parts of crystallized sodium sulfide, all added in succession, and the mixture is further stirred at the ordinary temperature until the sodium sulfide has disappeared. The whole is now diluted with water, common salt added and the dyestuff separated by addition of acid until the alkaline reaction can no longer be detected. The dyestuff obtained shows the properties of that obtained in accordance with the United States Patent No. 1,521,206 but its yield is considerably better than when it is made by the procedure described in that patent.

Similar results are obtained when other additions containing hydroxyl-groups, such as are hereinbefore referred to, are used.

Example 2.

To a concentrated suspension of the dyestuff made by coupling 160 parts of β-naphthol with 295 parts of the nitrated diazocompound of 1-amino-2-hydroxynaphthalene-4-sulphonic acid are successively added, while stirring, 25 parts of glycol or 25 parts of cane sugar, 145 parts of caustic soda solution of 30 per cent strength and 360 parts of crystallized sodium sulfide, and the whole is warmed at 80–90° C. until the sodium sulfide has disappeared. The dyestuff is then worked up as described in the preceding example. It is identical with the corresponding dyestuff made in accordance with the United States Patent No. 1,521,206 but is obtained in considerably better yield.

Another hydroxyl-compound can be used instead of glycol or cane sugar.

What we claim is:

1. In the manufacture of dyestuffs capable of being chromed by treating with a reducing agent an azo-dyestuff derived from nitrated diazotized 1-amino-2-hydroxynaphthalene-4-sulfonic acid and a naphthol, the improvement which consists in conducting the reduction in presence of a water-soluble organic compound containing hydroxyl-groups.

2. In the manufacture of dyestuffs capable of being chromed by treating with a reducing agent an azo-dyestuff derived from nitrated diazotized 1-amino-2-hydroxynaphthalene-4-sulfonic acid and a naphthol, the improvement which consists in conducting the reduction with an alkali sulfide in presence of a water-soluble organic compound containing hydroxyl-groups.

3. In the manufacture of dyestuffs capable of being chromed by treating with a reducing agent an azo-dyestuff derived from nitrated diazotized 1-amino-2-hydroxynaphthalene-4-sulfonic acid and a naphthol, the improvement which consists in conducting the reduction in presence of polyhydroxy alcohols.

4. In the manufacture of dyestuffs capable of being chromed by treating with a reducing agent an azo-dyestuff derived from nitrated diazotized 1-amino-2-hydroxynaphthalene-4-sulfonic acid and a naphthol, the improvement which consists in conducting the reduction with an alkali sulfide in presence of polyhydroxy alcohols.

5. In the manufacture of dyestuffs capable of being chromed by treating with a reducing agent an azo-dyestuff derived from nitrated diazotized 1-amino-2-hydroxynaphthalene-4-sulfonic acid and a naphthol, the improvement which consists in conducting the reduction in presence of polyhydroxy alcohols containing at most 3 carbon atoms.

6. In the manufacture of dyestuffs capable of being chromed by treating with a reducing agent an azo-dyestuff derived from nitrated diazotized 1-amino-2-hydroxynaphthalene-4-sulfonic acid and a naphthol, the improvement which consists in conducting the reduction with an alkali sulfide in presence of polyhydroxy alcohols containing at most 3 carbon atoms.

7. In the manufacture of dyestuffs capable of being chromed by treating with a reducing agent an azo-dyestuff derived from nitrated diazotized 1-amino-2-hydroxynaphthalene-4-sulfonic acid and a naphthol, the improvement which consists in conducting the reduction in presence of glycerine.

8. In the manufacture of dyestuffs capable of being chromed by treating with a reducing agent an azo-dyestuff derived from nitrated diazotized 1-amino-2-hydroxynaphthalene-4-sulfonic acid and a naphthol, the improvement which consists in conducting the reduction with an alkali sulfide in presence of glycerine.

In witness whereof we have hereunto signed our names this 27th day of March, 1926.

FRITZ STRAUB.
HERMANN SCHNEIDER.